(12) United States Patent
Pekonen et al.

(10) Patent No.: US 8,599,884 B2
(45) Date of Patent: Dec. 3, 2013

(54) SYSTEM AND METHOD FOR IMPLEMENTING OPTIMIZED MULTIPLEXING AND POWER SAVING IN A BROADCAST NETWORK

(75) Inventors: Harri J. Pekonen, Raisio (FI); Tommi Auranen, Turku (FI); Jussi Vesma, Turku (FI); Jani Väre, Kaarina (FI)

(73) Assignee: Nokia Corporation, Espoo (FI)

( * ) Notice: Subject to any disclaimer, the term of this patent is extended or adjusted under 35 U.S.C. 154(b) by 705 days.

(21) Appl. No.: 12/047,231

(22) Filed: Mar. 12, 2008

(65) Prior Publication Data

US 2009/0129302 A1 May 21, 2009

Related U.S. Application Data

(60) Provisional application No. 60/895,098, filed on Mar. 15, 2007.

(51) Int. Cl.
*H04L 12/26* (2006.01)

(52) U.S. Cl.
USPC .......................................... 370/512

(58) Field of Classification Search
None
See application file for complete search history.

(56) References Cited

U.S. PATENT DOCUMENTS

| | | | |
|---|---|---|---|
| 5,603,081 A | 2/1997 | Raith et al. | |
| 5,689,688 A * | 11/1997 | Strong et al. | 713/375 |
| 5,790,527 A * | 8/1998 | Janky et al. | 370/330 |
| 6,233,251 B1 * | 5/2001 | Kurobe et al. | 370/471 |
| 6,944,119 B1 * | 9/2005 | Sudo et al. | 370/208 |
| 7,257,371 B1 * | 8/2007 | Bettinger et al. | 455/13.2 |
| 7,283,564 B2 * | 10/2007 | Knapp et al. | 370/474 |
| 7,680,153 B2 * | 3/2010 | Ma | 370/503 |
| 2003/0064681 A1 * | 4/2003 | Uedo | 455/3.06 |
| 2004/0127166 A1 | 7/2004 | Oshima | |
| 2005/0111462 A1 * | 5/2005 | Walton et al. | 370/395.4 |
| 2006/0013168 A1 | 1/2006 | Agrawal et al. | |
| 2006/0195752 A1 | 8/2006 | Walker et al. | |
| 2006/0291386 A1 | 12/2006 | Jyske et al. | |
| 2007/0071003 A1 * | 3/2007 | Landolt | 370/389 |
| 2007/0116057 A1 * | 5/2007 | Murphy et al. | 370/503 |
| 2007/0140106 A1 * | 6/2007 | Tsai et al. | 370/208 |

FOREIGN PATENT DOCUMENTS

| | | |
|---|---|---|
| CN | 1906900 A | 1/2007 |
| WO | WO 02/23760 | 3/2002 |
| WO | WO2005055533 A1 | 6/2005 |

OTHER PUBLICATIONS

International Search Report for PCT/IB2008/050931.
English translation of Office Action for corresponding Russian Application No. 2009137871 dated Nov. 29, 2010.
Office Action for Chinese Patent Application No. 200880008350.5, dated May 18, 2011.
English translation of Office Action for Chinese Patent Application No. 200880008350.5, dated May 18, 2011.
Notification of 2nd Office Action in CN200880008350.5 dated Nov. 9, 2011, with English Translation and pending claims as of Nov. 9, 2011.
Rejection Decision in CN200880008350.5 dated May 3, 2012 with English translation.

* cited by examiner

*Primary Examiner* — Fan Ng
(74) *Attorney, Agent, or Firm* — Banner & Witcoff, Ltd.

(57) ABSTRACT

A system and method for implementing optimized multiplexing and power saving in a broadcast/multicast network. According to various embodiments, frame and slot structures are designed in such a way so as to adapt based upon the bit rate variation of the input stream, while at the same time not compromising the receiver's power consumption.

32 Claims, 10 Drawing Sheets

SYSTEM AND METHOD FOR IMPLEMENTING OPTIMIZED MULTIPLEXING AND POWER SAVING IN A BROADCAST NETWORK

CORRESPONDING APPLICATION

This application claims priority under 35 U.S.C. §119(e) of U.S. Provisional Application Ser. No. 60/895,098, filed Mar. 15, 2007, which is hereby incorporated by reference in its entirety for all purposes.

FIELD OF THE INVENTION

The present invention relates generally to broadcast/multicast services. More particularly, the present invention relates to broadcast/multicast service multiplexing.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The issue of power consumption in handheld devices such as mobile telephones has become increasingly problematic in recent years and is expected to continue to be an issue in the future. In particular, increased power consumption in such terminals increases terminal temperature. In many devices, however, the internal temperature has already reached its uppermost limit. Additionally, increased power consumption shortens the terminal's usage time unless the terminal's battery capacity is not correspondingly increased. However, terminals have been becoming both smaller and thinner in recent years, and this trend will likely continue. This trend has led to the unfortunate situation where terminal batteries need to be smaller at the same time that power consumption is increasing.

In response to the above constraints, a number of different mechanisms have been developed for broadcast and multicast systems with the goal of decreasing the power consumption of broadcast/multicast receivers. In radio communication systems, the radio spectrum is a scarce resource and therefore should be used in the most efficient manner possible.

In broadcasting systems, the data rate of an input stream coming to a device is not precisely known at a given moment. Instead, only the statistical behavior of the input stream is known. This can result in a capacity allocation problem, when several input streams having unknown characteristics (e.g., unknown bitrates) are multiplexed into one signal that will be transmitted over a broadcast/multicast system. A number of systems have been implemented to address the above. The issue of power consumption has been conventionally addressed in part, for example, through the use of different time division multiplexing (TDM) systems. In these systems, either the transmitter, the receiver, or both devices may power off portions thereof according to the particular TDM arrangement being used. Another option for addressing the power consumption issue has been to use frequency division. In frequency division arrangements, a used frequency band is divided into smaller sub-bands, and the transmitter or receiver uses only one or more of these sub-bands, thereby leading to smaller power consumption.

SUMMARY OF THE INVENTION

Various embodiments provide an improved system for use in broadcast and multicast use when a time division multiplexing system is needed. According to various embodiments, the frame and slot structures are designed in such a way so as to adapt based upon the bit rate variation of the input stream, while at the same time not compromising the receiver's power consumption. When successfully implemented, implementing various embodiments of the network achieves an improved or optimized capacity usage and improved or optimized terminal power saving at the same time.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF VARIOUS EMBODIMENTS

Various embodiments provide an improved system for use in broadcast and multicast use when a time division multiplexing system is needed. According to various embodiments, the frame and slot structures are designed in such a way so as to adapt based upon the bit rate variation of the input stream, while at the same time not compromising the receiver's power consumption. When successfully implemented, a terminal implementing various embodiments of the invention achieves an improved or optimized capacity usage and improved or optimized power saving at the same time.

Various embodiments may be utilized in digital broadband broadcast, for example Digital Video Broadcast-Handheld (DVB-H) or next generation DVB-H networks. Examples of other digital broadcast standards which may utilize various embodiments of the present invention include Digital Video Broadcast-Terrestrial (DVB-T), Integrated Services Digital Broadcasting-Terrestrial (ISDB-T), Advanced Television Systems Committee (ATSC) Data Broadcast Standard, Digital Multimedia Broadcast-Terrestrial (DMB-T), Terrestrial Digital Multimedia Broadcasting (T-DMB), Satellite Digital Multimedia Broadcasting (S-DMB), Forward Link Only (FLO), Digital Audio Broadcasting (DAB), and Digital Radio Mondiale (DRM). Other digital broadcasting standards and techniques, now known or later developed, may also be used. Aspects of the present invention may also be applicable to other multicarrier digital broadcast systems such as, for example, T-DAB, T/S-DMB, ISDB-T, and ATSC, proprietary systems such as Qualcomm MediaFLO/FLO, and non-traditional systems such 3GPP MBMS (Multimedia Broadcast/Multicast Services) and 3GPP2 BCMCS (Broadcast/Multicast Service).

Figure 1:
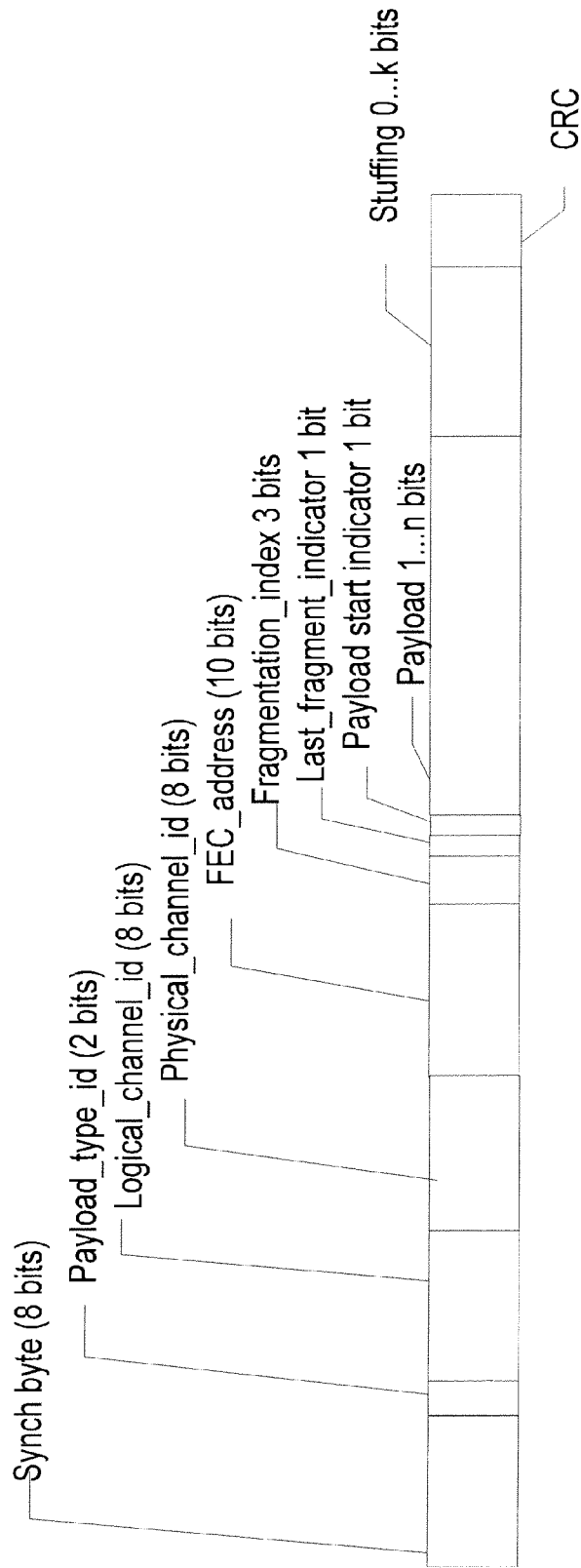
FIG. 1 is a representation showing an exemplary structure and syntax of a generic DSP packet.

FIG. 1 depicts an exemplary data stream protocol (DSP) packet, along with the relevant syntax for the packet portions. The "Synch byte" field enables the detection of the beginning of each DSP packet within receiver and network. The "Payload_type_id" field identifies the payload type encapsulated within the payload. (e.g., Service Discovery Descriptor (SDD), Neighboring Service Discovery Descriptor (NSDD), Internet Protocol (IP) or Reed Solomon (RS)). The "Logical_channel_id" field identifies the logical channel of the associated packet. The Logical_channel_id field is needed by the receiver for discovering the packets that are part of a specific logical channel (in case there are packets from more than one logical channel available within one slot). The "Physical_channel_id" field identifies the physical channel where the associated DS packet is carried. This enables a network element to allocate DSP packets into correct physical channels.

The "FEC_address" field is used for mapping DS packets carrying application data with corresponding DS packets carrying RS data in the event that FEC is used. If FEC is not used, this field can be ignored. The "fragmentation_index" field is a counter for the payload fragments encapsulated within DSP packets. The Fragmentation index enables a receiver to decapsulate the payload in the correct order, e.g., in the event that some packets are lost. The "Last_fragment_indicator" field indicates the last fragment of the encapsulated payload. The "Payload_start_indicator" field indicates whether the current DSP packet carries the first fragment of the encapsulated payload. The "Stuffing" field is 0 . . . n bits long and is added to the packet if the packet is not full in an embodiment in which the DSP packet has a fixed size. It should be noted that the illustrated sizes of the various fields are exemplary only and may vary in different embodiments. Additionally fields may also be defined, and one or more fields illustrated herein may not be present in certain embodiments.

The following is a representation of the syntax for a service discovery descriptor (SDD):

| service_discovery_descriptor ( ) { | |
|---|---|
| descriptor_tag | 2 |
| version_number | 6 |
| ESGproviderID | 8 |
| descriptor_length | 8 |

-continued

| service_loop_length | 8 |
|---|---|
| for (j=0;j<N;j++) { | |
| serviceID | 16 |
| reserved_future_use | 6 |
| logical_channel_id | 8 |
| physical_channel_id | 8 |
| fec_indicator | 1 |
| if (fec_indicator == 0x01){ | |
| frame_size | 7 |
| } | |
| slot_loop_length | 8 |
| for (k=0;k<N;k++) { | |
| slot_id | 8 |
| } | |
| frame_loop_length | 8 |
| for (l=0;l<N;l++) { | |
| frame_id | 8 |
| } | |
| } | |
| } | |
| CRC_32 | 32 |
| } | |

In the above, the "descriptor_tag" indicates the type of the descriptor. For example, a value of 0x01 can indicate that the descriptor is a service_discovery_descriptor. The "version_number" indicates the version of the descriptor. This field can be used by the terminal to detect whether there have been any changes to the descriptor since its last inspection thereof. The "ESGproviderID" identifies the electronic service guide (ESG) provider of the services announced within the descriptor. All services listed within the descriptor are unique within the associated ESGproviderID. The "service_loop_length" indicates the length of the following loop.

The "serviceID" is a unique identifier of the service within the scope of one ESG provider (e.g. that as defined in Digital Video Broadcasting Convergence of Broadcast and Mobile Services (DVB-CBMS) or Open Mobile Alliance Mobile Broadcast Services (OMA BCAST)). One serviceID may be associated with one or more IP streams (with each identified with an IP address). The "logical_channel_id" has a one-to-one mapping with the serviceID. This identifies the logical channel of the associated serviceID. The logical_channel_id is needed by the receiver for discovering the packets part of specific logical channel in the event that there are packets from more than one logical channel available within one physical channel. The "physical_channel_id" is an identifier of the physical channel where the associated logical_channel is carried.

The "fec_indicator" indicates whether Forward Error Correcting FEC is used for the associated service. If this indicator has been set to 0x01, then FEC is used for the associated service. Other indications may also be used. For example, 0x00 could indicate that no FEC is present. Additionally, the indicator values can also indicate the FEC code that is used. For example, the value 0x01 can indicate that the FEC code is RS(191,255). The "frame_size" indicates the FEC frame size in the event that the FEC is sported with the associated service. The "slot_loop_length" indicates the length of the following slot loop. Each slot loop iteration corresponds with the same iteration within the frame_loop. The "slot_id" identifies the slot in which the associated service is carried. One service can be carried within multiple slots located within one or more frames. The "frame_loop_length" indicates the length of the following frame loop. Each frame loop iteration corresponds with the same iteration within the slot_loop. The "frame_id" is an identifier of the frame. Each frame is associated with one or more slots.

The following is a representation of the syntax for a neighboring service discovery descriptor (NSDD):

```
neighbouring_service_discovery_descriptor ( ) {
    descriptor_tag                  2
    version_number                  6
    descriptor_length               8
    network_id                      8
    ESGproviderID
    cell_loop_length                8
    for (i=0;i<N;i++) {
        reserved_future_use         6
        cell_id                     10
        frequency                   32
        service_loop_length         8
        for (j=0;j<N;j++) {
            serviceID               16
            logical_channel_id      8
            physical_channel_id     8
            fec_indicator           1
            if (fec_indicator == 0x01){
                frame_size          7
            }
            slot_loop_length        8
            for (k=0;k<N;k++) {
                slot_id             8
            }
            frame_loop_length       8
            for (l=0;l<N;l++) {
                frame_id            8
            }
        }
    }
    CRC_32                          32
}
```

The "descriptor_tag" indicates the type of this descriptor. For example, in this situation, a value 0x02 can indicate a neighbouring_service_discovery_descriptor. The "version_number" indicates the version of the descriptor. This field can be used by the terminal to detect whether there are any changes within this descriptor since the last inspection. The "network_id" indicates the network of the elements described within this descriptor. The "ESGproviderID" identifies the electronic service guide provider of the services announced within this descriptor. All services listed within this descriptor are unique within associated ESGproviderID.

The "cell_loop_length" indicates the length of the following loops until CRC_32. The "cell_id" is an identifier of the cell. Each cell is unique within one network. The "frequency" is the center frequency of the radio frequency channel of the signal for the coverage area of the associated cell. The "service_loop_length" indicates the length of the following loop.

The "serviceID" is a unique identifier of the service within the scope of one ESG provider (e.g., that as defined in DVB-CBMS or OMA BCAST). One serviceID may be associated with one or more IP streams (each identified with IP address). The "logical_channel_id" has a one-to-one mapping with the serviceID. The logical_channel_id identifies the logical channel of the associated serviceID. This identifier is needed by the receiver for discovering the packets part of a specific logical channel in case there are packets from more than one logical channel available within one physical channel.

The "fec_indicator" indicates whether FEC is used for the associated service. If this indicator has been set to 0x01, then FEC is used for the associated service. The "frame_size" indicates the FEC frame size in the event that the FEC is sported with the associated service. The "slot_loop_length" indicates the length of the following slot loop. Each slot loop iteration corresponds with the same iteration within the frame_loop. The "slot_id" identifies the slot in which the associated service is carried. One service can be carried within multiple slots located within one or more frames. The "frame_loop_length" indicates the length of the following frame loop. Each frame loop iteration corresponds with the same iteration within the slot_loop. The "frame_id" is an identifier of the frame. Each frame is associated with one or more slots.

In various embodiments, guaranteed and common capacity for transmitted services are reserved. In these embodiments, services receive guaranteed capacity at each scheduled round. Common capacity is used to compensate for input stream bit rate variations. Compensation can be achieved by sharing this capacity in a contention reservation manner while still making sure that, in the event that some of the input streams do not behave correctly, the streams are not allowed to steal all of common capacity. This is achieved in the scheduler so that it weighs each input stream need based upon the input buffer fill levels.

Typically, not all common capacity is used during all scheduling periods. Therefore, this capacity can be used for best effort services. "Best effort service" refers to a network service in which the network does not provide any guarantees that data is delivered or that a user is given a guaranteed quality of service level or a certain priority. In a best effort network, all users obtain best effort service, meaning that they obtain an unspecified variable bit rate and delivery time, depending on the current traffic load. By removing features such as recovery of lost or corrupted data and preallocation of resources, the network operates more efficiently, and the network nodes are inexpensive. Best effort services may be scheduled for services such as file downloading, data carousels, or other type of services which do not require a constant bit rate. This arrangement is flexible in that it can adapt so as to use capacity when available. In a particular embodiment, such best effort services may possess a guaranteed bit rate. Examples of these types of services are the Electronic Service Guide in DVB-H, teletext in digital television systems and terminal software downloading service in digital television systems. In addition, a portion of the system signaling could be placed to use capacity labeled with best effort service. PSI/SI signaling in DVB-T/H is one example of such signaling.

Figure 2:
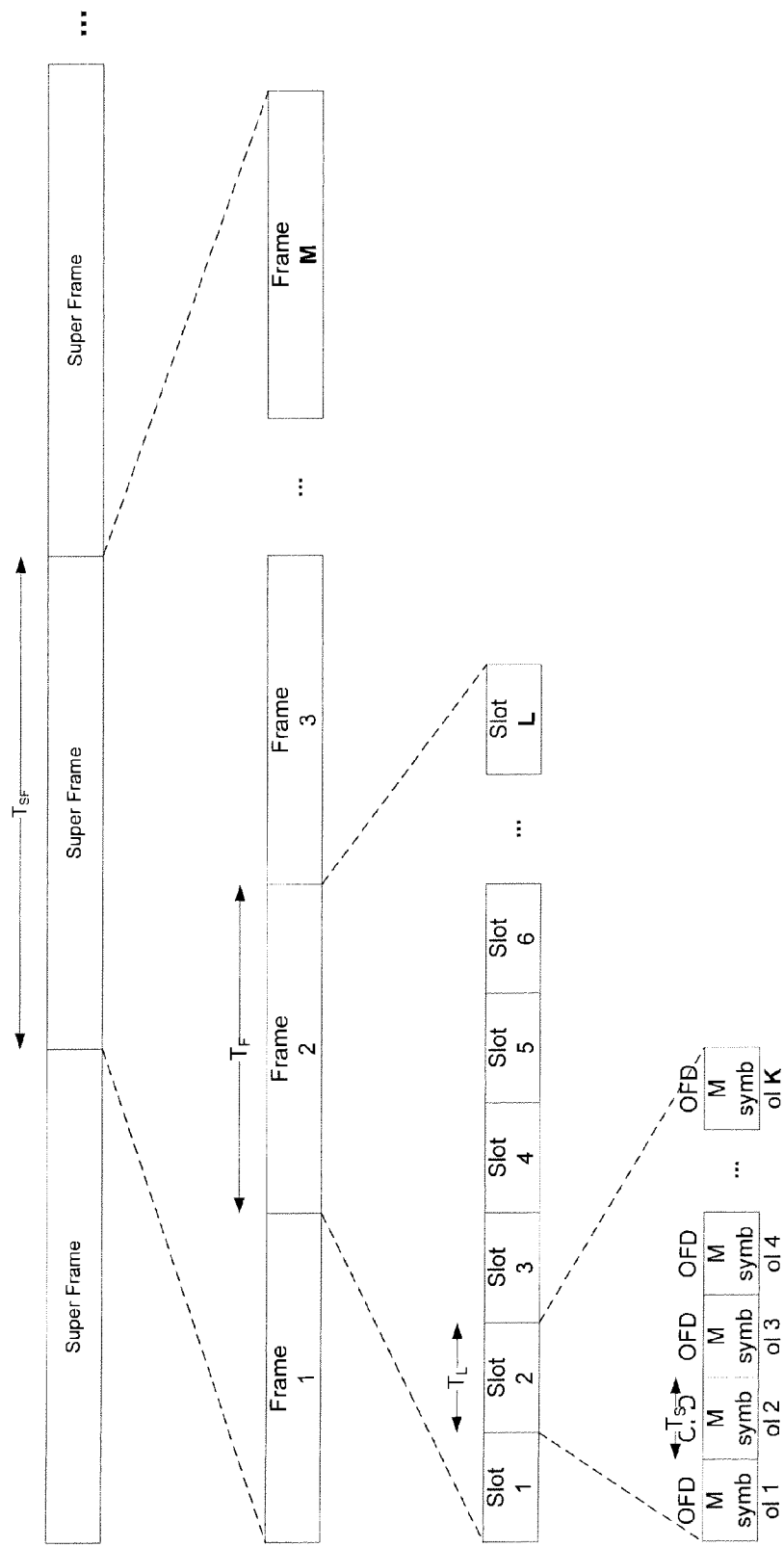
FIG. 2 is a diagram showing an example of the structure and relationships among superframes, frames, slots and symbols.

FIG. 2 is a diagram showing the structure and relationships between superframes 200, frames 210, slots 220 and symbols 230. Each superframe 200 (the length of each being identified as $T_{SF}$) includes multiple frames 210. Each frame 210 (the length of each being identified as $T_F$) includes multiple slots 220. Each slot 220 (the length of each being identified as $T_L$) includes multiple symbols 230 (the length of each being identified as $T_S$). $T_{SF}$ and $T_F$ are fixed for one network configuration, wherein $T_L$ is variable. $T_S$ may also be different in different slots. For example, if slot 1 is used for transmitting data for fixed high-definition receivers, maximum capacity is needed, and therefore an 8K mode or higher (16K or even 32K) is selected. In the same network, slot 2 can be used for transmitting data to mobile devices. When maximum mobile performance is sought, 2K, 4K or 8K is selected for slot 2. This means that $T_S$ is different in slots 1 and 2. $T_S$ may, in some embodiments, be changed "on the fly" if, for example, more bitrate is needed instantly. $T_S$ is configurable. If $T_S$ is changed, then $T_L$ can remain unchanged by changing K (the number of symbols). Each slot must form one or an integer number of interleaving blocks. The slot size (in bits) determines the size of the interleaving block (or its integer fraction).

The physical channel (PHY_channel) is determined by the combination of the set of slot numbers ($\{s_1, s_2, s_3 \ldots, s_R\}$, where $1 \leq R \leq L$) and the set of frame numbers ($\{f_1, f_2, f_3 \ldots,$ $f_P$}, where 1≤P≤M). Thus, each physical channel must have at least one slot in one super frame. For example, a slot_no={4} and a frame_no={1} means that the PHY_channel has one slot (no. 4) in one frame (no. 1) during every super frame. Similarly, a slot_no={4} and a frame_no={1, 2, 3, . . . , M} means that the PHY_channel has one slot (no. 4) in every frame during every super frame.

Figure 3A:
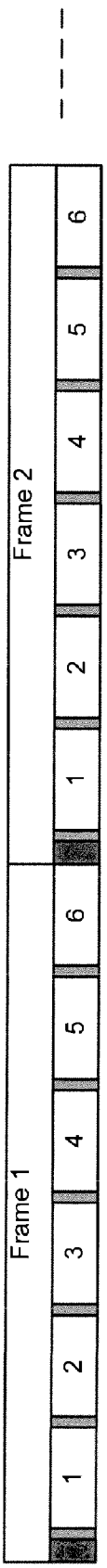
FIG. 3(a) is a representation of a conventional frame/slot structure, where the slot and frame sizes are fixed and there are a fixed number of slots within a frame.
Figure 3B:
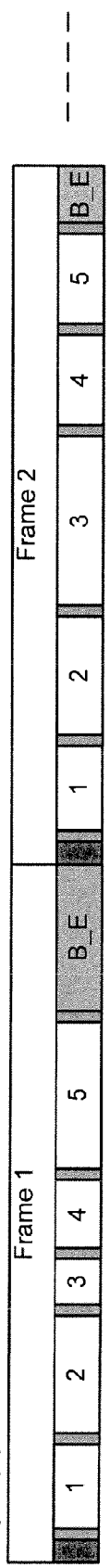
FIG. 3(b) is a representation of a frame/slot structure where the slot size is variable, the frame size is fixed, and there are a fixed number of slots within a frame.
Figure 3C:
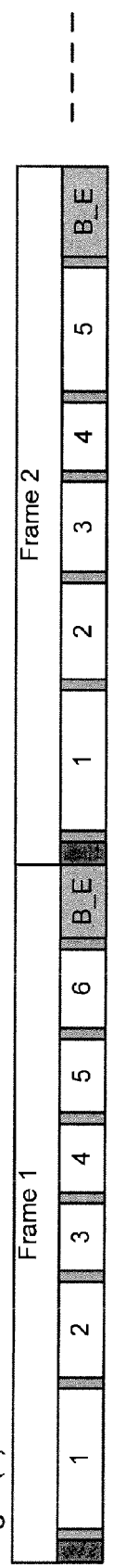
FIG. 3(c) is a representation of a frame/slot structure where the slot size is variable, the frame size is fixed and the number of slots within a frame is variable.
Figure 3D:
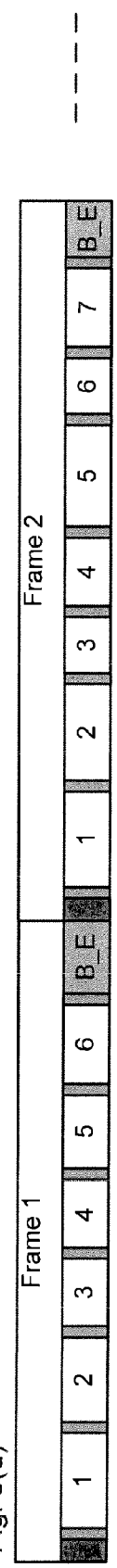
FIG. 3(d) is a representation of a frame/slot structure where the slot and frame sizes are variable and the number of slots within a frame is variable.

FIGS. 3(a)-3(d) show four variants of a slot/frame structure for transmission according to different embodiments of the present invention. In general and according to various embodiments, the number of slots within a frame can vary from frame to frame. This is shown in FIGS. 3(c) and 3(d). Additionally, the frame size may also vary, as shown in FIG. 3(d). This is in contrast to FIG. 3(a), which shows fixed slot and frame sizes and a fixed number of slots within a frame. For the purposes of the following, it is assumed that the number of slots is fixed within all frames, and either each frame or the larger "super frame" has a fixed length. This arrangement is depicted in FIG. 3(b). In this version, best effort service is used to fill the rest of the frame/super frame. In another alternative, it is ensured that each frame/super frame does not overflow by changing one, some, or all of the Code Rates (block code CR, inner code CR, or outer code CR) during the frame or slot.

For scheduling, simple round-robin scheduling can be used. However, for each round, slot sizes are calculated based on input bit rate variation. Services having a longer interval (i.e. services that occur only in every $N^{th}$ frame) can be placed in the front of a fixed size frame. It is then sufficient to signal how many frames are between slots and not how many symbols are included, thereby using fewer bits.

In various embodiments, optimal power saving is achieved by having synchronization symbols in the system to enable as fast as possible of a synchronization time. These synchronization symbols may be located at least at the beginning of each frame. In addition, such synchronization symbols may also appear within the frames. According to one embodiment, one or more synchronization symbols are located immediately before each slot so that an optimal synchronization can be achieved when receiving a series of slots. According to another embodiment of the invention, information when the next slot is received in a series of slots is provided. This information can be transmitted, for example, in the synchronization symbols. Information comprises, for example, an indication of a relative time or number of Orthogonal Frequency Division Multiplex (OFDM) symbols from the current symbol to the first synchronization symbol of the next slot in the same series of slots.

Figure 4:
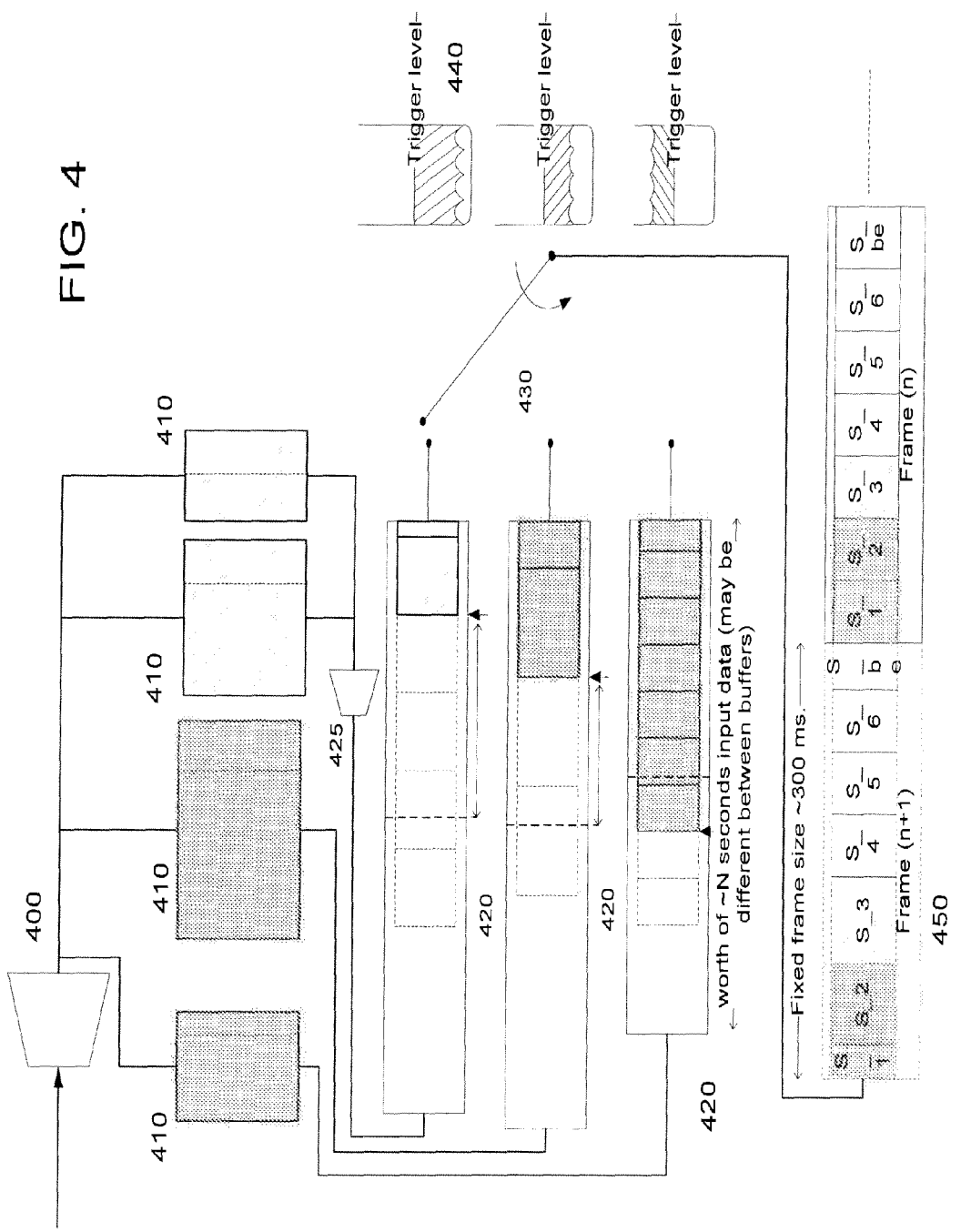
FIG. 4 is a diagram showing a representative transmitter flow according to one embodiment of the present invention.

FIG. 4 is a diagram showing a representative transmitter flow according to one embodiment of the present invention. As shown in FIG. 4, an input stream de-multiplexer 400 is used to de-multiplex inputted streams for optional block forward error correction (FEC) based upon a set of predetermined criteria.

A series of block FEC units are shown at 410. One block FEC unit may contain data for a portion of a service, for one entire service, or several services. Incoming application data is written to block FEC frames, and FEC is then calculated. Each block FEC unit 410 may have a unique code rate. In one embodiment, the left-hand part of the FEC unit 410 is reserved for incoming data packets, and the right-hand part is reserved for the calculated FEC. Furthermore and in one embodiment, the left-hand part is first filled column-wise with the incoming packets, and the FEC is then calculated, e.g., using a Reed Solomon method row-wise. After calculation the FEC, data is read out of the right-hand part column-wise. The application data in the left-hand column is also read out column-wise, but in an embodiment only a copy of the application data packets are written into the left part of the FEC unit, and the original application data is forwarded without waiting for the FEC calculations.

Once a particular block FEC unit 410 has finalized FEC calculation for one frame, it forwards the incoming data and FEC data to an input data bit rate compensation buffer 420 (also referred to herein as "input buffers" and "buckets.") The size of each input bit rate compensation buffer 420 may be different from other such input buffers 420. Each input buffer 420 may include data and FEC data from one or optionally several block FEC units 410, whose output data, i.e., application data, and FEC data may be multiplexed to one buffer 425. The size of each input buffer 420 should be selected such that there is sufficient room to buffer data without a risk of overflow. Each input buffer 420 should provide its size and current fill level for slot size calculation.

After the process has been completed at the input buffers 420, a scheduling and slot size calculation is performed. This is represented generically at 430 in FIG. 4. The following is a simplified example of scheduling and frame filling:

```
For ever
    Frame.size:== Frame.size (max)   - New frame, starting with empty frame
    For all slots                    - All slots are filled to guaranteed level
        While slot.size (N) < guaranteed size (N)
            Slot (N):== bucket.sub_slot (N)
            Frame.size:== Frame.size - bucket.sub_slot.size (N)
        End While
    End for
    While Frame is not full or no bucket contain data enough for one sub_slot
                                     - Continue until frame is fulfilled
        For all buckets excluding best effort service bucket
            Bucket.fill_rate (k):== Fill_level (k) / bucket_size (k) - Calculate fill_rate for all
slots
        End for
        Output:== bucket (max [bucket.fill_rate (k)])         - Select fullest bucket
        Slot (output):== bucket.sub_slot (output)             - Read data from bucket to slot
        Fill_level (output):== Fill.level (output) - bucket.sub_slot (output)
                                     - Remove outputted data from bucket
        If all buckets are empty
            BE_slot:== Bucket.packet (BE_slot)
        End if
    End While
```

Figure 5:
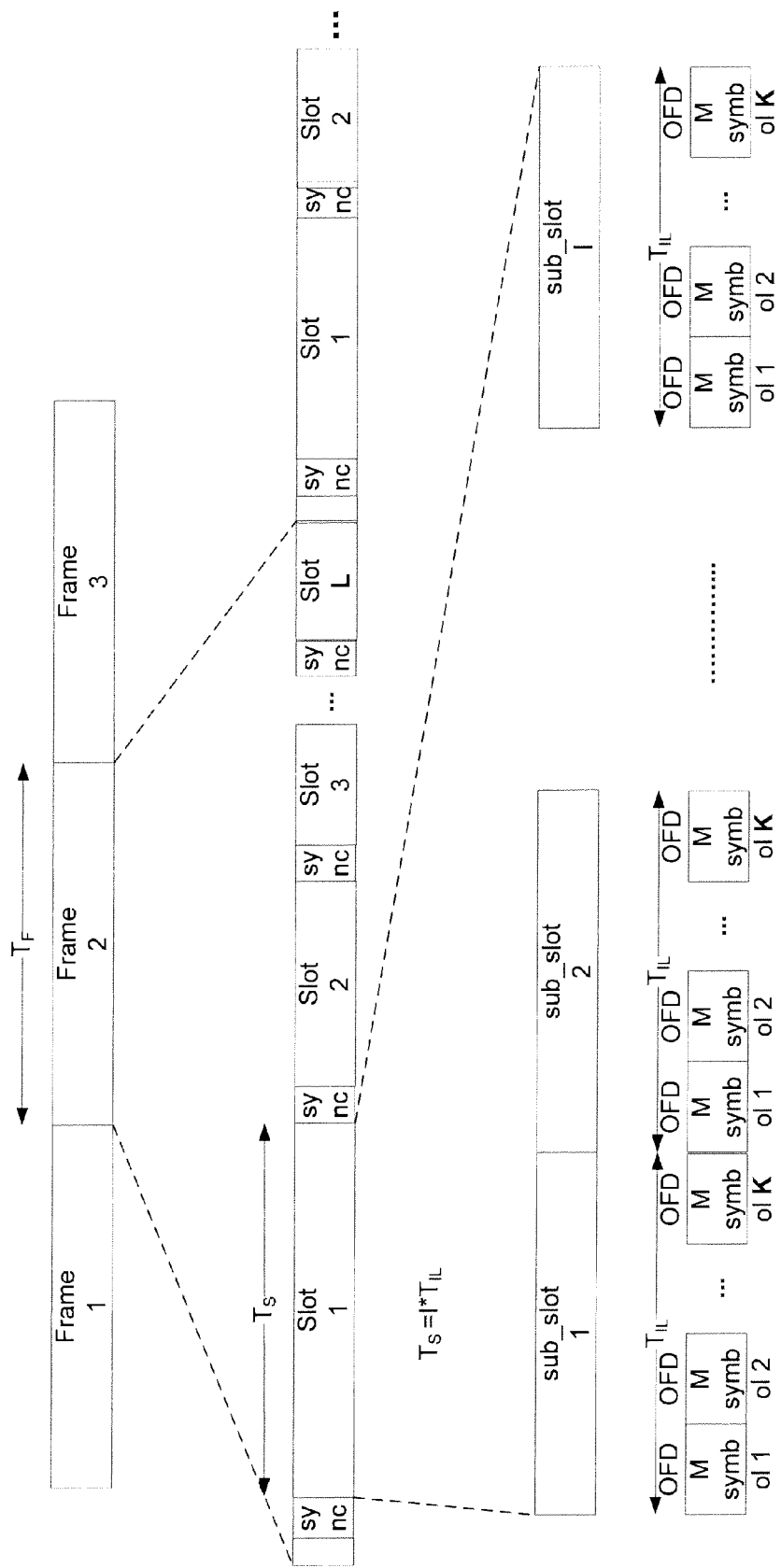
FIG. 5 is a representation showing the relationships between symbols, sub_slots, slots, and frames according to various embodiments.

FIG. 5 is a representation showing the relationships between symbols, sub_slots, slots, and frames. Each sub_slot includes an integer number of OFDM symbols. Each slot includes an integer number of sub_slots. The size of sub_slot is selected, in one embodiment, so that it contains data for one inner code block. These two limitations ensure that data from each received slot can be forwarded after a whole slot is received, and receiver resources can be released to receive other slots immediately after each slot is received.

Figure 10:
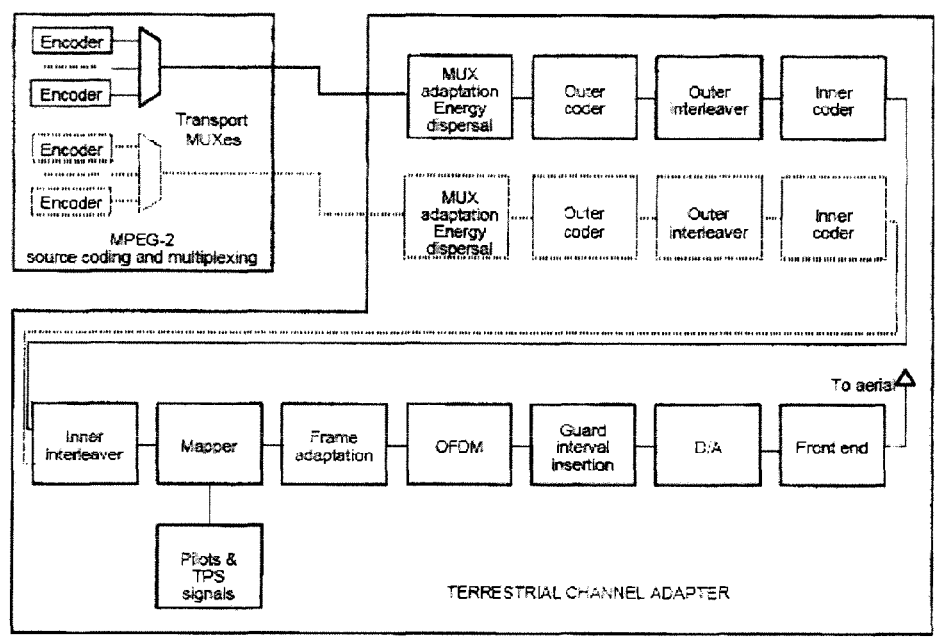
FIG. 10 is a functional block diagram showing a system capable of implementing various embodiments.

Overall buffer level tracking and bit rate matching is represented generally at 440 in FIG. 4. Optionally, the overall input buffer level can be monitored. This information can be used, in addition to slot size variation, to compensate for input bit rate variation. Compensation can be accomplished for an individual slot when the particular slot's bucket fill level is crossing a predetermined threshold, or to several slots when a common threshold is crossed. When buffers are sufficiently empty, transmission can be adjusted, for example, to a more robust mode and vice versa. The output bit rate can be modified to compensate bit rate variation in the input bit rate with at least following parameters:
1. Modulation Parameters
  QPSK, 16-QAM, 64-QAM (these are exemplary)
  CR of the Inner coder
  CR of the Outer coder
  The Inner code and the Outer Coder are depicted in the functional block diagram of FIG. 10, which shows framing structure, channel coding and modulation for digital terrestrial television.
2. Block FEC CR
3. Feedback to Audio/Video Encoders can be Also Provided Slot/frame generation is represented at 450 in FIG. 4. At this stage, application data and FEC data, if in use, are mapped to symbols, and synchronization symbols are added to the stream. Also, required real-time signaling information is added to synchronization symbols. It should be noted that, although synchronization symbols are discussed herein as being located immediately before each slot, in some cases the synchronization symbols are not added to start of each slot. This can be done, for example, due to the need to save some capacity from synchronization symbols for services.

Figure 6:
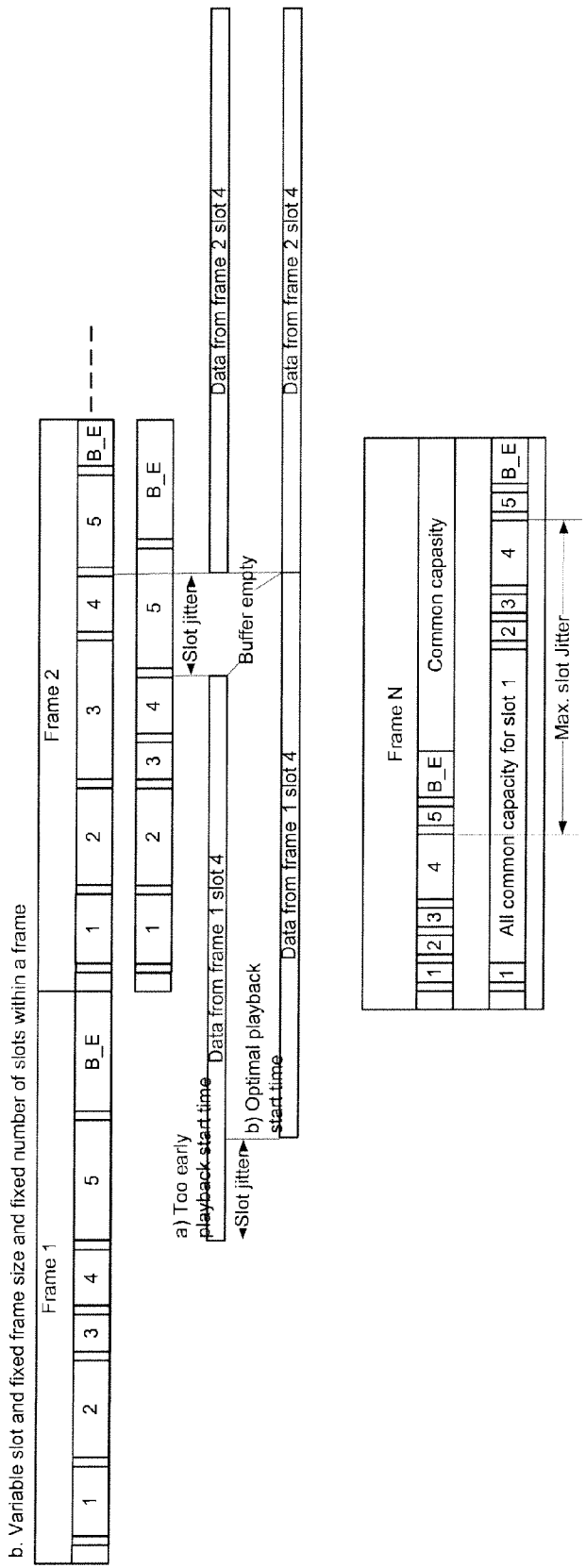
FIG. 6 is a representation of a receiver's initial buffering process according to an embodiment.

In terms of signaling, the following discusses signaling in the variable slot size situation. FIG. 6 shows a receiver's initial buffering process. In slot series number 4 in FIG. 6, as slot sizes are not fixed, the slot start location relative to the frame start changes depending on the behavior of other slots. In FIG. 6, it is observable that frame 2, slot 3 is much larger than the same slot in frame 1. Therefore, slot 3 has "pushed" slot 4 forward by some amount of time in frame 2. This amount of time is referred to as "slot jitter." In this situation, if a receiver starts consuming slot 4 from frame 1 right after previously slot was ended, the receiver will run out of data slot jitter time before it receives new slot from frame 2. However, if the receiver starts consuming data from frame 1 slot jitter time after the end of the slot, it will then have enough data before the new slot 4 from frame 2 arrives.

In the situation depicted in FIG. 6, relatively simple formulas can be used to calculate the maximum slot jitter caused by the use of common capacity and variable slot sizes. Additionally, it should also be noted that there may be cases where the capacity for slots can be guaranteed only after N frames. This will also introduce jitter.

If there are one or more synchronization symbols immediately before each slot, it is not necessary to add extra signaling to indicate the end of slots. This is because, in this situation, the receiver knows that the burst ended when a new synchronization symbol was received. When there are slots without synchronization symbols, the start and end of each slot can be indicated in a protocol header, such as is conventionally done in DVB-H with real time parameters. This information can take the form of synchronization symbols. In this case, start and end indications can comprise, for example, a relative time from the synchronization symbol that carries the information.

Figure 7:
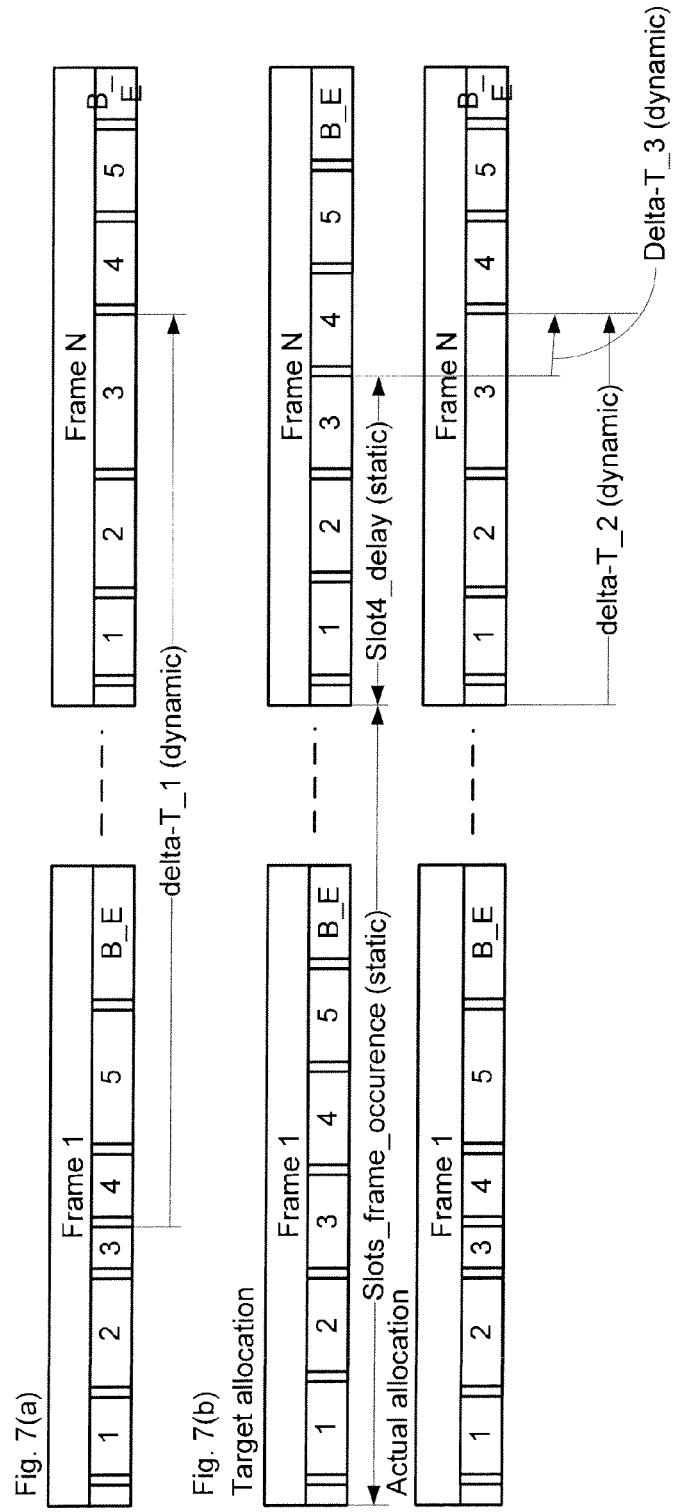
FIGS. 7(a) and 7(b) are representations of various mechanisms by which slot start signaling may be implemented according to various embodiments.

FIGS. 7(*a*) and 7(*b*) show a number of options by which slot start signaling may be implemented. A first option, depicted in FIG. 7(*a*), involves using a signal (dynamic) delta-T_1, that represents the time from the beginning of the slot or the synchronization symbols preceding the slot in a first frame carrying a service to the beginning of the next slot or the synchronization symbols preceding the slot in the next frame carrying the same service. In this case, no static data link layer (L2 in the Open System Interconnection (OSI) model) signaling is needed. Delta-T_1 would be as long as the time from the start of frame 1, slot 4 to the start of frame N, slot 4. Part of the delta_t can be optimized away if the frame duration is fixed and the slots use the same frames.

In a pair of variants to this process, depicted in FIG. 7(*b*), information of the frames used by each slot is signaled (i.e., all frames, every other frame, frames (1 3 5 6), etc.) This information can be located in the L2 signaling and can be provided for all slots. As the frame length is fixed, the frame number would be enough information for the first slot of the frame. For the other slots, some real time signaling is needed if optimal power saving is sought. In the first of the two variants, the target static slot_delay information is signaled in L2. Actual (dynamic) delta-T_3 information is also signaled. In this case, delta-T_3 indicates the difference (delay or advance) compared to static information. The second variant involves signaling (dynamic) delta-T_2 from the start of the frame to the actual slot occurrence. In each case, synchronization symbols or L2 protocol headers (like in DVB-H) can be used to carry the dynamic portion of the signaling.

Synchronization symbols can take a number of forms. For example, synchronization symbols can comprise, for example, pilot and signaling symbols. Additionally, relative timing information and end of slot indications can also be added to one of the signaling symbols. Although synchronization symbols may be included immediately before each slot, it is also possible for each slot to include synchronization symbols. In one particular embodiment, each slot starts with synchronization symbols. In other embodiments, however, this arrangement is not necessary. For example, due to capacity saving reasons, synchronization symbols may not be inserted into every slot. In this case, the receiver needs to wake up earlier so that it can receive one set of synchronization symbols before receiving a desired slot.

Figure 8:
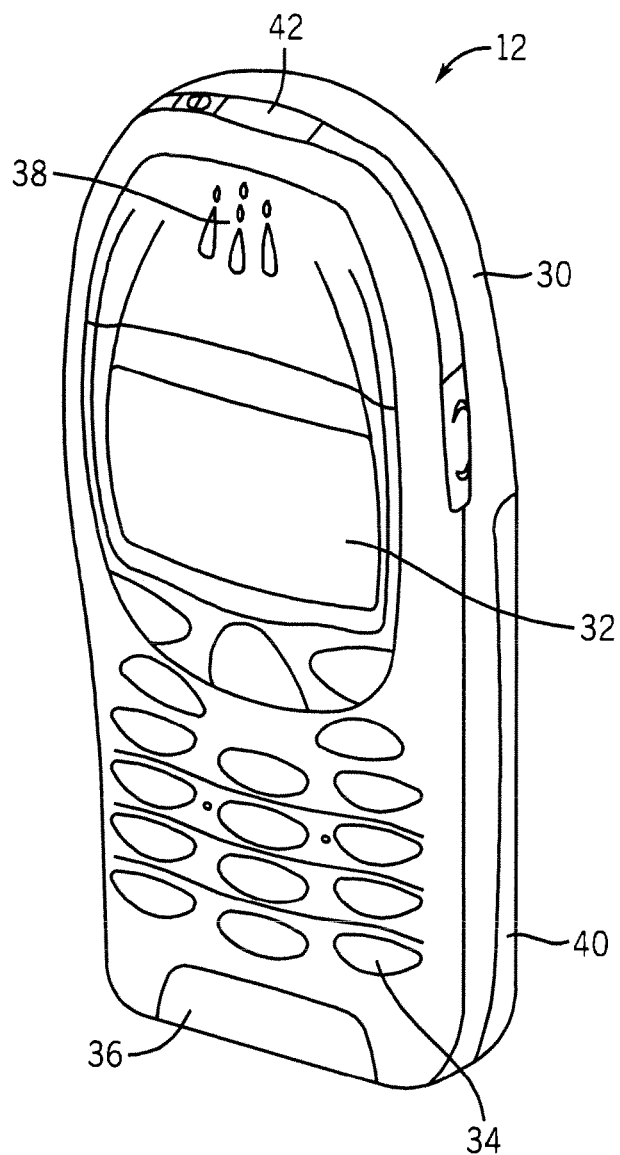
FIG. 8 is a perspective view of an electronic device that can be used in conjunction with the implementation of various embodiments.
Figure 9:
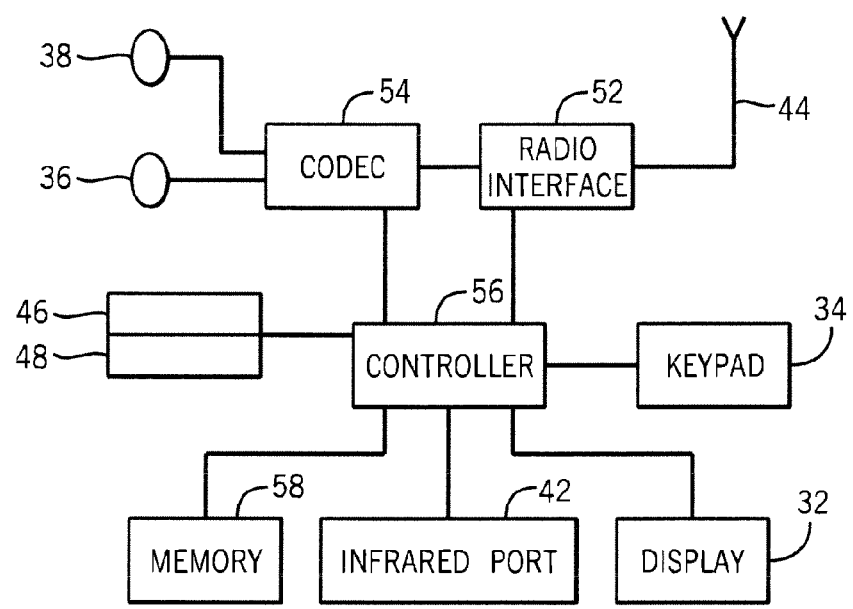
FIG. 9 is a schematic representation of the circuitry which may be included in the electronic device of FIG. 8.

FIGS. 8 and 9 show one representative electronic device 50 within which the present invention may be implemented. It should be understood, however, that the present invention is not intended to be limited to one particular type of device. The electronic device 50 of FIGS. 8 and 9 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile telephones.

The various embodiments described herein is described in the general context of method steps or processes, which may be implemented in one embodiment by a computer program product, embodied in a computer-readable medium, including computer-executable instructions, such as program code, executed by computers in networked environments. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Individual and specific structures described in the foregoing examples should be understood as constituting representative structure of means for performing specific functions described in the following the claims, although limitations in the claims should not be interpreted as constituting "means plus function" limitations in the event that the term "means" is not used therein. Additionally, the use of the term "step" in the foregoing description should not be used to construe any specific limitation in the claims as constituting a "step plus function" limitation. To the extent that individual references, including issued patents, patent applications, and non-patent publications, are described or otherwise mentioned herein, such references are not intended and should not be interpreted as limiting the scope of the following claims.

Software and web implementations of various embodiments of the present invention can be accomplished with standard programming techniques with rule-based logic and other logic to accomplish various database searching steps or processes, correlation steps or processes, comparison steps or processes and decision steps or processes. It should be noted that the words "component" and "module," as used herein and in the following claims, is intended to encompass implementations using one or more lines of software code, and/or hardware implementations, and/or equipment for receiving manual inputs.

The foregoing description of embodiments have been presented for purposes of illustration and description. The foregoing description is not intended to be exhaustive or to limit embodiments to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated.

What is claimed is:

1. A method, comprising:
    using at least one input buffer to buffer a plurality of input data streams;
    scheduling portions of the plurality of input data streams for signaling within a plurality of frames, each of the plurality of frames including a plurality of slots to accommodate inclusion of the portions therein;
    adding best effort services to unallocated capacity within one or more of the frames; and
    generating the plurality of frames for signaling, the generating including adding a plurality of synchronization symbols to the plurality of frames, wherein the synchronization symbols comprise signaling information including relative timing values of a respective plurality of start locations of the plurality of slots within each of the plurality of frames.

2. The method of claim 1, wherein at least one of the synchronization symbols is added immediately before every slot in each frame.

3. The method of claim 1, wherein no synchronization symbol is added immediately before at least one slot in each frame.

4. The method of claim 3, further comprising, for the at least one slot in each frame that has no synchronization symbol added immediately before, adding an indication to the signaling information of a start and an end of the at least one slot.

5. The method of claim 1, wherein the plurality of synchronization symbols are added within individual slots of each frame.

6. The method of claim 1, further comprising adding realtime signaling information to the plurality of synchronization symbols.

7. The method of claim 1, wherein a size of at least one slot within each frame is variable.

8. The method of claim 7, wherein the signaling information includes signaling jitter information concerning at least one of the slots within each frame.

9. The method of claim 1, wherein a number of slots within each frame is variable, a size of each slot is variable, and a size of each frame is variable.

10. The method of claim 1, wherein a number of slots within each frame is variable, a size of each slot is variable, and a size of each frame is fixed.

11. The method of claim 1, wherein a number of slots within each frame is fixed, a size of each slot is variable, and a size of each frame is fixed.

12. A non-transitory computer-readable medium having computer executable instructions stored thereon, the computer executable instructions configured to, with at least one processor:
    cause a plurality of input data streams to be buffered with at least one input buffer;
    schedule portions of the plurality of input data streams for signaling within a plurality of frames, each of the plurality of frames including a plurality of slots for the inclusion of the portions therein;
    add best effort services to unallocated capacity within one or more of the frames; and
    generate the plurality of frames for signaling, the generating including adding a plurality of synchronization symbols to the plurality of frames, wherein the synchronization symbols comprise signaling information including relative timing values of a respective plurality of start locations of the plurality of slots within each of the plurality of frames.

13. An apparatus, comprising:
    a processor; and
    at least one memory including computer program code configured to, with the processor, cause the apparatus at least to:
    use at least one input buffer to buffer a plurality of input data streams;
    schedule portions of the plurality of input data streams for signaling within a plurality of frames, each of the plurality of frames including a plurality of slots to accommodate inclusion of the portions therein;
    add best effort services to unallocated capacity within one or more of the frames; and
    generate the plurality of frames for signaling, the generating including adding a plurality of synchronization symbols to the plurality of frames, wherein the synchronization symbols comprise signaling information including relative timing values of a respective plurality of start locations of the plurality of slots within each of the plurality of frames.

14. The apparatus of claim 13, wherein at least one of the synchronization symbols is added immediately before every slot in each frame.

15. The apparatus of claim 13, wherein no synchronization symbol is added before at least one slot in each frame.

16. The apparatus of claim 15, wherein the generating further comprises, for the at least one slot in each frame that has no synchronization symbol added immediately before, adding to the signaling information an indication of a start and an end of the at least one slot.

17. The apparatus of claim 13, wherein the plurality of synchronization symbols are added within individual slots of each frame.

18. The apparatus of claim 13, further comprising adding real-time signaling information to the plurality of synchronization symbols.

19. The apparatus of claim 13, wherein a size of at least one slot within each frame is variable.

20. The apparatus of claim 19, wherein the signaling information includes signaling jitter information concerning at least one of the slots within each frame.

21. The apparatus of claim 13, wherein a number of slots within each frame is variable, a size of each slot is variable, and a size of each frame is variable.

22. The apparatus of claim 13, wherein a number of slots within each frame is variable, a size of each slot is variable, and a size of each frame is fixed.

23. The apparatus of claim 13, wherein a number of slots within each frame is fixed, a size of each slot is variable, and a size of each frame is fixed.

24. A method, comprising:
receiving a signaled plurality of frames, each frame including a plurality of slots comprising data from a plurality of input data streams, and each frame including a plurality of synchronization symbols, wherein the synchronization symbols comprise signaling information including relative timing values of a respective plurality of start locations of the plurality of slots within each of the plurality of frames;
processing the plurality of synchronization symbols from the plurality of frames; and
processing the plurality of frames using the signaling information included in the plurality of synchronization symbols to identify at least one of the plurality of start locations of the plurality of slots.

25. The method of claim 24, further comprising processing received jitter information concerning at least one of the slots, the jitter information received from a sending device.

26. The method of claim 24, wherein at least one of the synchronization symbols is included immediately before every slot in each frame.

27. The method of claim 24, wherein no synchronization symbol is included before at least one slot in each frame.

28. The method of claim 24, wherein the at least one of the plurality of slots includes a slot that is not a first slot in any of the plurality of frames.

29. The method of claim 24, wherein the at least one of the plurality of slots includes at least two slots of different sizes in the same frame.

30. A non-transitory computer-readable medium having computer executable instructions stored thereon, the computer executable instructions configured to, with at least one processor:
cause an apparatus to receive a signaled plurality of frames, each frame including a plurality of slots comprising data from a plurality of input data streams, and each frame including a plurality of synchronization symbols, wherein the synchronization symbols comprise signaling information including relative timing values of a respective plurality of start locations of the plurality of slots within each of the plurality of frames;
cause the apparatus to process the plurality of synchronization symbols from the plurality of frames; and
cause the apparatus to process the plurality of frames using the signaling information included in the plurality of synchronization symbols to identify at least one of the plurality of start locations of the plurality of slots.

31. An apparatus, comprising:
a processor; and
at least one memory including computer program code configured to, with the processor, cause the apparatus at least to:
cause the apparatus to receive a signaled plurality of frames, each frame including a plurality of slots comprising data from a plurality of input data streams, and each frame including a plurality of synchronization symbols, wherein the synchronization symbols comprise signaling information including relative timing values of a respective plurality of start locations of the plurality of slots within each of the plurality of frames;
cause the apparatus to process the plurality of synchronization symbols from the plurality of frames; and
cause the apparatus to process the plurality of frames using the signaling information included in the plurality of synchronization symbols to identify at least one of the plurality of start locations of the plurality of slots.

32. The apparatus of claim 31, wherein the computer program code is further configured to, with the processor:
cause the apparatus to process received jitter information concerning at least one of the slots, the jitter information received from a sending device.

* * * * *